United States Patent Office 3,584,072
Patented June 8, 1971

3,584,072
METHOD OF EPOXIDIZING WATER INSOLUBLE POLYAMIDES
Alfred Edwards Winslow, Unadilla, N.Y., assignor to Borden, Inc.
No Drawing. Continuation-in-part of application Ser. No. 583,460, Sept. 30, 1966. This application July 22, 1969, Ser. No. 843,856
Int. Cl. C08g 20/38
U.S. Cl. 260—785C     4 Claims

ABSTRACT OF THE DISCLOSURE

This invention relates to an improved process for epoxidizing water insoluble polyamides. The process comprises epoxidizing in the presence of added water soluble acid a polyamide formed by reacting a carbocyclic polycarboxylic acid with a polyalkylene polyamine, which polyamide is of limited water solubility below 10% concentration by weight in water, and which develops insolubility characteristics at concentrations of 25%–70% by weight of reactive components during epoxidation in a suitable solvent system.

RELATED APPLICATIONS

The application is a continuation-in-part of Ser. No. 583,460, filed Sept. 30, 1966, Alfred Edwards Winslow, entitled, "Epoxidized Polyamides" now abandoned.

DETAILED DESCRIPTION OF THE INVENTION

This invention relates to the preparation of certain thermosetting epoxidized polyamides and in particular those made utilizing carbocyclic polycarboxylic acids.

Thermosetting epoxy resins formed by reacting a polyamide prepolymer derived from a polyalkylene polyamine and carbocyclic polycarboxylic acids with a compound containing oxirane group are very useful as binders in wet strength paper.

These epoxidized polyamides are formed by first reacting a polycarboxylic acid with polyalkylene polyamine to form the polyamide prepolymer and then epoxidizing the polyamide prepolymer in a solvent system. However, epoxidation of polyamide prepolymers formed with carbocyclic polycarboxylic acids has not been successful. Such polyamides have limited solubility or develop insolubility characteristics in the solvent system at desirable concentrations usually employed for epoxidation, which solubility is even more limited with the higher molecular weight polyamides (for example, those having a bulk viscosity of 5,000 centipoises and above at 60% solids) desired for increased wet strength performance. This makes epoxation difficult and the resultant product not as stable as required. Also the limited solubility leads to phase separation during epoxidation and to thickening, and can lead, ultimately, to non-reversible cross-linking to an insoluble product before epoxidation is completed. It has not been found possible to epoxidize polyamide prepolymers made with carbocyclic polycarboxylic acids efficiently and without the difficulties due to solubility heretofore encountered.

Briefly stated, the present invention comprises the process of epoxidizing in the presence of added water soluble acid a polyamide derived by reacting a carbocyclic polycarboxylic with a polyalkylene polyamine, which polyamide is of "limited water solubility" below 10% concentration by weight in water, and which develops insolubility characteristics at concentrations of 25%–70% by weight of reactive components during epoxidation in a suitable solvent system. The process of this invention thus provides a commercially attractive method of epoxidizing a polyamide prepolymer which has limited water solubility due to either the nature of the acid used to form the polyamide prepolymer or its molecular weight or a combination of these factors.

The polyamide prepolymers utilized in preparing the thermosetting epoxy end product resins are obtained by first reacting the cyclic acid and polyalkylene polyamine with application of heat so as to produce prepolymers of limited water solubility. The temperature employed for carrying out this reaction may vary from 100° C.–250° C. at atmospheric pressure. The reaction time depends upon the temperature used and will vary from approximately one-half hour to twenty hours.

As to materials, the polyalkylene polyamine used is any of the common aliphatic polyamines having at least two primary amine groups and at least one secondary amine group. Specific examples are diethylenetriamine, triethylenetetraamine, tetraethylenepentamine, dipropylenetriamine, homologous series in which the ethylene group is replaced by propylene, butylene, or any $C_3$–$C_4$ alkylene group, and mixtures thereof. Various known modifying agents, such as urea, melamine, lactams, aliphatic diamines, and aromatic diamines can be used in minor proportions with the polyamines for their intended effect, such as to increase the wet strength properties of the final resin.

The carbocyclic acids contemplated for use are those having from 4–16 carbons which yield polyamide prepolymers of limited water solubility. These are preferably monocyclic aromatic dicarboxylic acids such as isophthalic acid and terephthalic acid. However, non-aromatic hydrogenated derivatives of phthalic acid such as tetrahydrophthalic and hexahydrophthalic acids can also be employed. Other suitable groups are cycloalkyl carboxylic acids and bicyclic aromatic dicarboxylic acids. Exemplary of this group and other acids which are contemplated are diphenic, oxydibenzoic, phenylindane dicarboxylic, camphoric, phenylenediacetic, and homophthalic acids and hydrogenated derivatives of such homophthalic acids. As is known, acids such as trimellitic, pyromellitic, and other acids having more than two carboxyl groups, or their anhydrides, can be used in combination with the above acids to provide chain branching in the polyamide. Also, minor amounts of saturated and unsaturated aliphatic polycarboxylic acids can be used to obtain the hydrophilic-hydrophobic balance desired in the polyamide formed.

In converting the polyamides of this invention, formed as described previously, to a highly stable thermosetting resin, the polyamide is reacted with an oxirane containing compound so as to introduce the epoxy group;

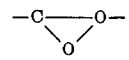

The preferred epoxy group containing compound is epichlorohydrin, although other epihalohydrins such as epibromohydrin and epiiodohydrin can also be used. Also operative, but not as suitable, are the epihalohydrin forming compounds such as dichloro- and dibromohalohydrins.

The polyamide is reacted with the oxirane containing compound in a solvent system. The solvent can be water, an organic solvent such as ethylene glycol and $C_1$–$C_4$ saturated alcohols, glycol ethers, or mixtures thereof. It is preferred to use a mixture of methanol and water. By solvent system is meant the solvent including the water soluble acid. Preferably, the reaction mixture is heated to a temperature within the range of 40° to about 100° C. and heating discontinued when the epoxidation is completed to the degree desired. The endpoint is determined when the desired pH, water dilutability, clarity, viscosity and product stability are attained depending on the end-use sought. During processing one or more dilutions with solvent may be required to permit the reaction to continue to the desired endpoint. The resultant product is promptly cooled and diluted with water to prevent further reaction.

Since one of the primary objects of this invention is to obtain a polyamide-epoxy end product suitable for producing a wet strength paper, it is necessary when making the polyamide to use an amount of carbocylic polycarboxylic acid sufficient to react substantially completely with the primary amine groups of the polyalkylene polyamine but insufficient to react with the secondary amine groups to any substantial extent. This requires from about 0.9–1.6 moles of polyamine for each mole of cyclic acid. The polyamide thus formed by the use of the aforementioned class of listed acids and polyamines in the reaction ratio set forth above has limited water solubility which prevents homogeneous and controlled epoxidation reactions in aqueous systems. Although concentrated aqueous syrups can be made from most of these polyamide intermediates, this syrup cannot be infinitely diluted with water without percipitating some of the polymer. Even the syrups are frequently supersaturated when made, and solidify upon long standing as a result of this limited water solubility.

The term "limited water solubility" as used herein with reference to the polyamide materials which may be epoxidized in accordance with the teachings of this invention are those which are substantially insoluble below a 10% concentration by weight in water, and which further develop insoluble characteristics at concentrations of 25%–70% usually employed for epoxidation of polyamides. These polyamides may and frequently do show insolubility below a concentration of 35% in water. By the phrase "develop insoluble characteristics" is meant the phenomenon they exhibit of transforming into still less soluble reactive polymer intermediates during intermediate stages of the epoxidation, and before final conversion into completely water soluble and dilutable products. The phenomenon is usually evident visually as a transformation from an initially clear reaction mixture to a two phase, opaque system, which imperatively must later revert, upon continued reaction, to a single phase if the desired water dilutable product is obtained.

It is desirable to epoxidize polyamides in a reaction medium wherein the combined concentrations of polyamide and oxirane containing compound comprises 25%–70% by weight of the total medium. Thus is known from the art to be a desirable range of initial reaction concentrations to obtain reasonable reaction rates consistent with control of exotherm and with maintaining a soluble and not cross-linked state throughout the reaction period.

Epoxidation of the polyamides described without the use of this invention results in one or more of the following disadvantages: (1) separation of a resinous phase enriched with a reactive polymer intermediate, (2) the conversion of this intermediate to a cross linked, insoluble, useless reaction product, (3) persistence of a fraction of the less soluble intermediate in the product in the forms of haziness or small gels, (4) poor mixing of the more viscous resinous phase resulting in, for example, local gelation, (5) low yields of desired product because of losses to gel, (6) increased difficulty of cleaning equipment after use, (7) the necessity of using, cleaning and maintaining expensive filtration equipment, (8) excessive costs caused by substantial usage of organic solvents to improve miscability (9) unstable products subject to gelation during storage and handling, because of inability to successfully complete the desired epoxidation reaction, and (10) poor reproducibility of epoxidation conditions and resultant product properties.

A commercially attractive method of epoxidation on both technical and ecomonic grounds is a process wherein all ten disadvantages are minimized or eliminated.

Furthermore, it is desired that the process at no time during its completion approach closer than necessary to a precipitous condition of loosing a batch of material beyond recovery. Such a loss can occur almost instantly by coagulation and non-reversible crosslinking of the polyamides of this invention while they are being epoxidized and before they are successfully converted to water soluble products. Danger of loss is virtually eliminated as a direct result of removing or minimizing the cited disadvantages.

Especially symptomatic of being further away from such a precipitous failure are the conditions of less phase separation, a minimum of time duration of a second phase, lower maximum viscosities during the period of maximum in solubility, and freedom from non-reversible gel formation for example on walls of the reaction vessel, mixing equipment, or heat exchangers.

Surprisingly, it has been discovered that early additions in small quantities of any freely water soluble acid as hereinafter described, to the reaction mixture accomplishes these combined objectives of minimizing or eliminating the disadvantages and of providing a commercally attractive method. Specifically, the advantages are (1) lessening of the amount of phase separation, (2) prevention of loss of product to a non-reversible gel in the reaction vessel, (3) a shorter time of presence of the less soluble phase, (4) better mixing as a result of less separation of a resinous phase and of lower effective viscosities, (5) higher product yields, (6) no equipment cleaning problems, (7) minimal filtration requirements and no need of mechanical filtration equipment, (8) freedom of working in aqueous systems containing little or no organic solvents, (9) improved product stability, eliminating the need of stabilizer post additions common to the art, and minimizing dangers of the products becoming solidified to a gel and insoluble prior to its use, and (10) much improved reproducibility of the process and resultant product properties.

It is preferred to use from about 0.9–1.6 moles of polyamine and 0.4–3.5 moles of the epoxy compound for each mole of cyclic acid.

Any freely water soluble organic or water soluble inorganic mineral acid can be used in accordance with the present invention so as to permit the satisfactory epoxidation. By freely soluble is meant the capability of forming at least a 5% solution in water. The organic acids can be aliphatic, or cycloaliphatic. Thus suitable classes or organic acids are the lower alkanoic acids, or the lower cycloalkyl carboxylic acids. Exemplary of acids are formic acid, acetic acid, glycolic acid, malic acid, lactic acid, sulfuric acid, cyclobutyl dicarboxylic acid, and hydrochloric acid. Of these, formic acid is preferred.

The water soluble acid is added, preferably at the beginning of the epoxidation reaction, although it may be added after the reaction has been initiated. However, it is critical that the acid be present during the epoxidation reaction.

The amount of water soluble acid used can vary from about 0.4 to about 1 mole per mole of secondary amine present in the polyamide. Preferred is 0.06 moles to 0.2 mole.

The invention has particular utility with polyamides having a molecular weight sufficiently high to give a bulk viscosity of 5,000 centipoises or above when measured as a 60% concentration by weight in water, as determined with a Brookfield viscometer at 25.0 C., and is even more applicable to those giving viscosities of at least 10,000 centipoises.

For most purposes, adequate wet strength may be obtained by incorporating in the paper from about 0.25% to about 3% of the resin based on the dry weight of the pulp. However, in special cases, up to 5% or more may be used.

The invention will be further illustrated by description in connection with the following specific examples of the practice of it. In these examples and elsewhere herein, the proportions are expressed as parts by weight except when specifically stated to the contrary.

EXAMPLE 1

198.5 parts of a polyamide formed by reacting 1.1 moles of a commercial mixture of 33% diethylenetriamine and 67% triethylenetetramine with 1 mole of a mixture of 95% isophthalic acid and 5% terephthalic acid and 80 parts of water were placed into a vessel and agitated to dissolve the polyamide. The following temperature-viscosity relationship when measured as a hot melt with a Brookfield viscometer characterizes the polyamide.

| Temperature | Cps. |
|---|---|
| 210 | 11,000 |
| 204 | 15,000 |
| 199 | 19,000 |
| 195 | 29,000 |
| 190 | 36,000 |
| 185 | 51,200 |
| 179 | 72,000 |

The polyamide gave a bulk viscosity when measured as a 60% resin concentration in water at 25.0° C., of 16,800 centipoises. Formic acid in amount of 6.58 parts of 90% concentration was then added to the solution together with 169.5 parts of water and the solution heated to 40° C., whereupon 142.1 parts of epichlorohydrin were then added slowly with agitation over a period of 12 minutes while the temperature was maintained at 40° C. The concentration of reactive components was 58%. A resinous phase started separating in dispersed form from the reaction medium 4 minutes after addition of the epichlorohydrin was started. After addition of the epichlorohydrin was completed the temperature was raised to 60° C. and heating continued for 22 minutes. The resinous phase stayed dispersed by normal stirring while the viscosity increased several fold. Additional formic acid (2.33 parts) and 21.3 parts of water were then added which caused final disappearance of the insoluble resinous phase, and the reaction was continued for 10 minutes at 60° C., followed by addition of 764.6 parts water. (A second addition of formic acid is unessential if a little more is included in the original addition). Following final heating at 60° for 7 minutes, the solution was diluted with water to a total solids content of 16% and cooled to 25° C. to prevent further reaction. The product had the clarity, viscosity, and stability required for maximum performance in imparting wet strength.

The resultant epoxidized product was infinitely dilutable in water at 25° C. and on extended storage remained fluid. It had a Brookfield (Model HBT) viscosity of 30 cps. measured at 25° C. using Spindle No. 1 and 100 r.p.m.

EXAMPLE 2

250 parts of a polyamide, formed as in Example 1, but in which the commercial amine mixture was 35% diethylenetriamine and 65% triethylenetetramine was added with 123.1 parts of solvent. The solvent was composed of 22.3% ethylene glycol, 31.2% methanol, and 46.5% water. 225.9 parts of methanol and 7.95 parts of formic acid (90%) were added with stirring to form a clear, light yellow solution which was heated to 40° C.

188 parts of epichlorohydrin were then slowly added with stirring over a five minute period while the temperature was maintained at 40° C. The temperature was then raised to 60° C. and the reaction continued until a Brookfield viscosity at 60° C. of 600° cps. was attained.

The product was then diluted with methanol to 17% total solids and cooled to room temperature.

EXAMPLE 3

A solution was made by stirring in a vessel 105.6 parts of the polyamide of Example 1, 101.7 parts water, 31.8 parts methanol, and 3.27 parts acetic acid. The solution was heated to 40° C. and 75.6 parts of epichlorohydrin slowly added over a period of 14 minutes.

After epichlorohydrin addition was completed the temperature was raised to 60° C. and the reaction continued for 54 minutes. 419.8 parts of water were then added and heating at 60° C. continued for an additional hour. The solution was then diluted to 11.5% total solids with water and cooled to 25° C.

EXAMPLES 4–7

A series of epoxidations were carried out using the compositions, 4 through 7, listed below. After forming a solution of the polyamide, water, methanol, and acid the epichlorohydrin was added slowly in each case with the temperature at 40° C. The temperature was then raised to 60° C. and epoxidation was completed at that temperature.

| Example No. | 4 | 5 | 6 | 7 |
|---|---|---|---|---|
| Polyamide of Example 1 | 105.6 | 105.6 | 105.6 | 105.0 |
| H₂O | 92.6 | 100.4 | 102.1 | 103.6 |
| Methanol | 31.6 | 32.0 | 31.9 | 32.4 |
| Water soluble acid: | | | | |
| (a) Hcl (1:1 HCl by vol.) | 10.5 | | | |
| (b) Glycolic acid (70%) | | 5.96 | | |
| (c) Sulfuric acid (96.7%) | | | 4.15 | |
| (d) Malic acid | | | | 7.27 |
| Epichlorohydrin | 75.6 | 75.6 | 75.6 | 75.6 |
| H₂O added during epoxidation | 494.0 | 499.8 | 499.4 | 506.6 |
| Methanol added during epoxidation | 22.8 | 23.1 | 23.1 | 23.4 |

The additional water and methanol were added during the epoxidation when the viscosity became high in order to lower the viscosity and permit further reaction. The final solution of each example was diluted with water to a total solids content of 11.5 and cooled to room temperature.

EXAMPLE 8

105.0 parts of the polyamide of Example 1 were stirred with 86.9 parts of water and 93.3 parts of methanol to form a clear solution. The solution was kept at 40° C. while 75.2 parts of epichlorohydrin were slowly added over a period of 15.5 minutes. The temperature was slowly raised to 60° C. and the reaction had not yet been completed when the mass started to coagulate as additional solvent (deionized water) was being added to complete the reaction. The reaction could not be continued until an aqueous solution containining 10.2 cc. of 1:1 HCl was added.

EXAMPLE 9

The composition and procedure of Example 1 are used except that the polyamines and cyclic polycarboxylic acids there used are replaced, in turn, by an equimolar portion of each of the other polyamines and polycarboxylic acids listed herein.

The epoxidized polyamides prepared in accordance with the present invention can be used to impart wet strength to fibrous materials (e.g., paper), as coating, and for the other known uses of epoxidized polyamides.

It will be understood that it is intended to cover all changes and modifications of the examples of the invention herein chosen for the purpose of illustration which do not constitute departures from the spirit and scope of the invention.

What is claimed is:
1. In the method of epoxidizing a polyamide of high viscosity, said polyamide having a bulk viscosity of at least 5,000 centipoises at 60% solids and which is substantially water insoluble at a concentration of 10% or below by weight and which further develops insoluble characteristics when epoxidized in a solvent system at concentrations of 25% to 70% of total reactive components, said polyamide being the reaction product of a carbocyclic dicarboxylic acid with a polyalkylene polyamine having at least two primary amine groups and at least one secondary amine group, the epoxidation being carried out by reacting in a solvent the polyamide with a compound containing an oxirane group, the proportion of reactants being 0.9 to 1.6 moles of polyamine for each mole of carbocyclic dicarboxylic acid and 0.4 mole to 3.5 moles of oxirane containing compound for each mole of dicarboxylic acid, the improvement which comprises carrying out the epoxidation reaction in the presence of a freely water soluble acid, said acid being present in an amount of about 0.04 mole to about 1 mole of freely water soluble acid for each mole of secondary amine in the polyamide.

2. The method of claim 1, wherein the water-soluble acid is an organic acid.

3. The method of claim 2, wherein the organic acid is formic acid.

4. The method of claim 3, wherein the dicarboxylic acid is a phthalic acid, the polyamine is polyethylene polyamine, the organic acid is formic acid used in the proportion of 0.06 to 0.2 mole per mole of secondary amine in the polyamide.

References Cited
UNITED STATES PATENTS
3,329,657  7/1967  Strazdins et al. -------- 260—78

HAROLD D. ANDERSON, Primary Examiner

U.S. Cl. X.R.

162—164R; 260—29.2N, 47CZ, 77.5C, 78L, 78TF